Feb. 13, 1934.  F. G. SHOEMAKER  1,947,023
PISTON PIN LUBRICATION SYSTEM
Filed April 5, 1933

Inventor
Fred G. Shoemaker
By Blackmore, Spencer & Flint
Attorneys

Patented Feb. 13, 1934

1,947,023

UNITED STATES PATENT OFFICE

1,947,023

PISTON PIN LUBRICATION SYSTEM

Fred G. Shoemaker, Ferndale, Mich., assignor to General Motors Research Corporation, Detroit, Mich., a corporation of Delaware Application April 5, 1933. Serial No. 664,504

4 Claims. (Cl. 184—6)

This invention relates to means providing for the adequate lubrication of the piston pin bearing of an engine and particularly for a two-cycle internal combustion engine.

In a two-cycle engine the load on the piston pin and connecting rod big end due to the gas pressure in the cylinder is always in the same direction (there is no suction stroke and the pressure in the cylinder is substantially always superatmospheric) and in most of such engines is not at any time exceeded by any inertia forces acting in the opposite direction so that the resultant load on the piston pin and the connecting rod big end is always in one direction although varying cyclically in value and it is difficult to lubricate the continuously loaded reciprocating piston pin bearing.

The object of the invention is to provide means for supplying an adequate amount of lubricating oil under sufficient pressure to maintain a film of oil between the piston pin and its bearing.

According to the invention this is attained by the provision of an oil passage through the connecting rod from the region of maximum oil film pressure in the big end bearing to suitable grooves on the loaded side of the piston pin or small end bearing and by providing this passage with a non-return valve near the big end bearing so that it will tend to accumulate oil under a pressure equal to the maximum oil film pressure reached in the connecting rod big end bearing. In this way and whenever a point in the cycle is reached where the load on the piston pin is less than the pressure of the oil stored up in the oil passage, this oil, supplied to grooves on the loaded side of the piston pin bearing, will lift the piston pin away from its bearing and thus establish an oil film between the rubbing surfaces. The pressure accumulated in the passage through the connecting rod will be several times the unit bearing load and, assuming the big end bearing to be supplied with oil at a pressure of 20 to 40 lbs. per square inch, it may in practice reach as high as 1000 to 3000 lbs. per square inch. The oil accumulated in the passage will attain its highest pressure on the working stroke and will establish an oil film in the small end bearing on the compression stroke, for instance.

In the drawing

Figures 1, 2, 3:
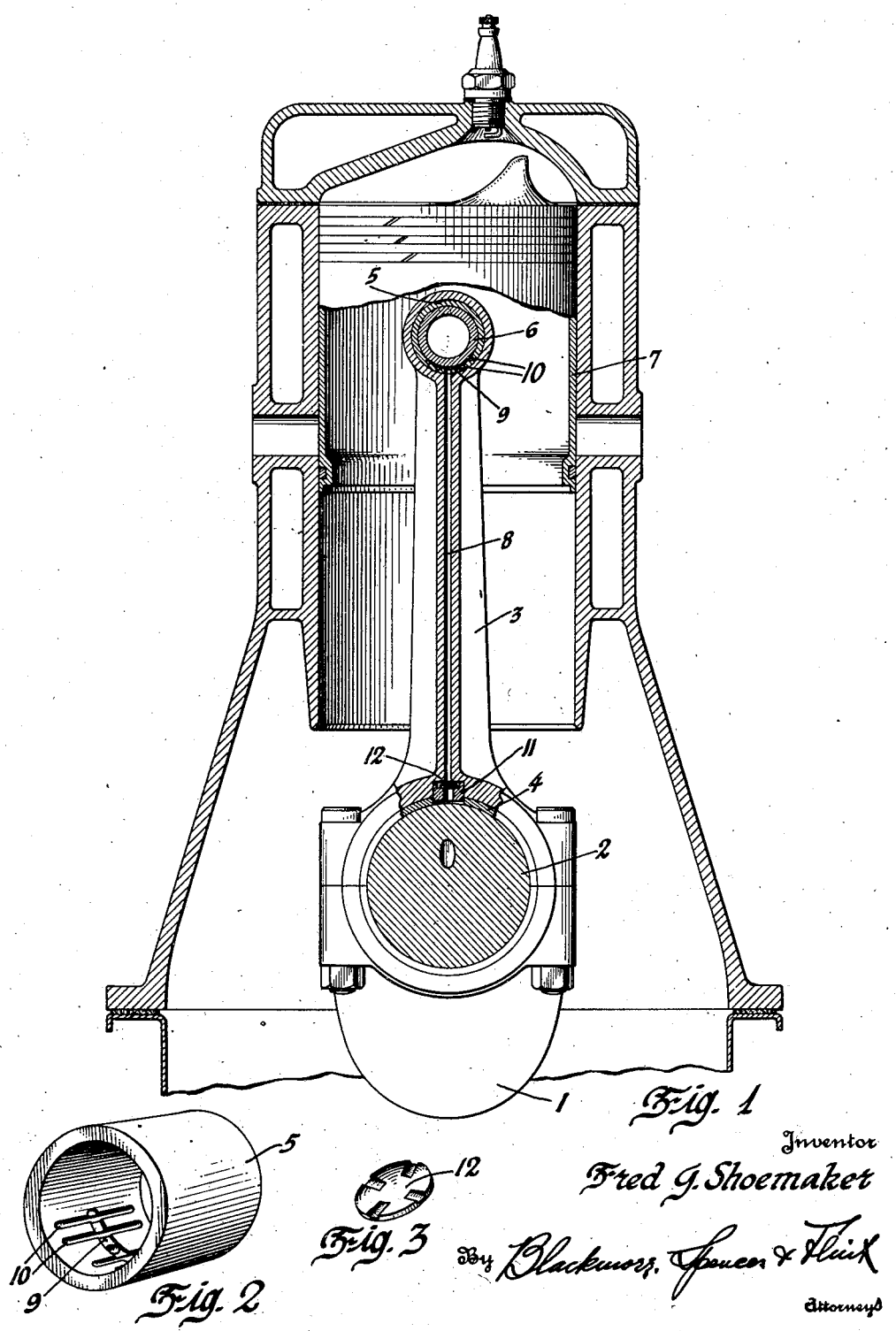
Figure 1 shows a sectional elevation of a two-cycle engine including a connecting rod and its bearings according to the invention.
Figures 2 and 3 are perspective views of the piston pin bearing and the check valve.

The crankshaft 1 has a crankpin 2. The connecting rod 3 has a big end bearing 4 encircling the crankpin and a piston pin bearing 5 encircling a piston pin 6 fixed in the piston 7.

A passage 8 through the connecting rod opens into a channel 9 extending circumferentially on the loaded side of the bearing surface of the piston pin bearing 6. The channel 9 is provided with lateral grooves 10 which distribute the oil from the channel over the length of the bearing. The total area of the channel and grooves is such as to provide a total oil pressure on the pin greater than the total pressure of the pin on the bearing surface.

The other end of the passage 8 through the connecting rod opens into the region of maximum oil film pressure in the big end bearing. It is counterbored to provide for a bored bushing 11 plugged therein and which forms a seat for a non-return valve 12 which is a thin convex disc of low inertia having notches or the like in its periphery so that it cannot be two-way acting.

I claim:

1. In combination a piston, a crank shaft with a crank pin, a connecting rod with a small end bearing in the piston and a big end bearing on the crank pin, the small end bearing being continuously loaded in one direction by a cyclically varying load, a zone of maximum oil film pressure in the big end bearing at a maximum pressure greater than that which is required to support the load on the small end bearing when this is at its lowest value in any cycle, an oil duct leading from this zone to the continuously loaded zone of the small end bearing, and means to accumulate oil in the duct at a pressure higher than the loading on the small end bearing when this is at its lowest value in any cycle, the oil pressure in the duct tending to be equal to the maximum oil film pressure of the big end bearing, whereby the load on the small end bearing is lifted off the continuously loaded zone of the bearing by the oil in the duct at least once in each cycle of load variation, and an oil film thereby maintained between the continuously loaded zone of the small end and the load thereon.

2. The combination according to claim 1 in which the means to accumulate oil under pressure in the duct consists of a non-return valve allowing oil to flow therethrough from the big end bearing towards the small end bearing when the oil film pressure in the big end bearing is greater than the pressure in the duct but preventing its flow in an opposite direction.

3. The combination according to claim 1 in which the means to accumulate oil under pressure in the duct consists of a non-return valve which is a thin convex disc of low inertia allowing oil to flow therethrough from the big end bearing towards the small end bearing when the oil film pressure in the big end bearing is greater than the pressure in the duct but preventing its flow in an opposite direction.

4. In combination a bearing, a zone thereof having a load thereon varying cyclically in pressure but acting continuously in one direction, a second bearing having a zone of maximum oil film pressure at a maximum pressure greater than that which is required to support the load on the first named bearing when this is at its lowest value in any cycle, an oil duct between the zone of maximum oil film pressure of the second bearing and the continuously loaded zone of the first named bearing, and means tending to accumulate oil in the duct at a pressure equal to the maximum oil film pressure of the second bearing whereby the load on the first named bearing is lifted off the continuously loaded zone of the bearing by the oil in the duct at least once in each cycle of pressure variation and an oil film thereby maintained between the continuously loaded zone and the load.

FRED G. SHOEMAKER.